March 9, 1965 P. A. WARD 3,172,623
AIRCRAFT POWER PLANT
Filed Jan. 3, 1963 2 Sheets-Sheet 1
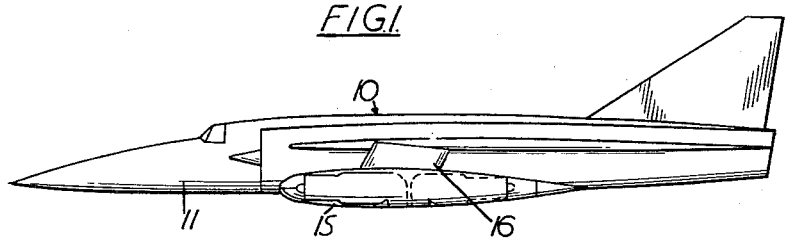
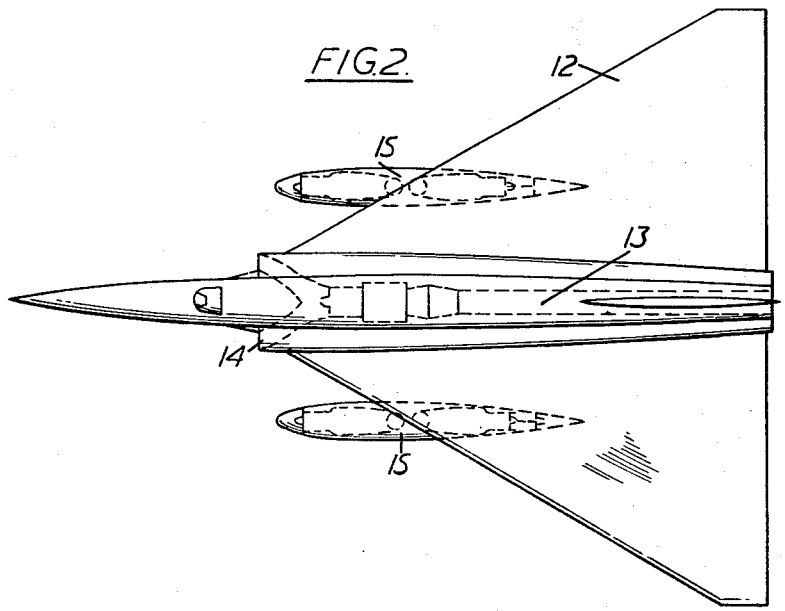
Inventor
Peter Arthur Ward
By
Fred E. Shoemaker &
Fred L. Witherspoon, Jr. Attorney March 9, 1965 P. A. WARD 3,172,623
AIRCRAFT POWER PLANT Filed Jan. 3, 1963 2 Sheets-Sheet 2

Inventor,
Peter Arthur Ward
By
Fred E. Shoemaker +
Fred L. Witherspoon Jr. Attorney

United States Patent Office 3,172,623
Patented Mar. 9, 1965

3,172,623
AIRCRAFT POWER PLANT
Peter Arthur Ward, Derby, England, assignor to Rolls-Royce Limited, Derby, England, a company of Great Britain
Filed Jan. 3, 1963, Ser. No. 249,159
2 Claims. (Cl. 244—55)

This invention concerns power plants.

According to the present invention, there is provided a power plant comprising an elongated pod within which are mounted two jet engines which extend longitudinally of the pod, the two jet engines having exhaust nozzles which are disposed adjacent to each other and which direct the jet gases transversely of the pod.

The engines are preferably arranged back to back, the said nozzles being disposed centrally of the length of the pod.

The pod is preferably provided with doors which, when open, permit air to be drawn into the engine air intakes, the doors, when closed, forming a part of the outer wall structure of the pod, which part merges smoothly into the remaining part thereof.

Preferably there are two sets of doors, one for each engine, one of said sets of doors serving, when the pod is travelling longitudinally forwardly, to scoop air into the air intake of the respective engine.

The pod may be made of a synthetic resin material such for example as fibre glass.

The invention also comprises an aircraft provided with power plant as set forth above, the said pod being horizontally disposed and the said nozzles being arranged to direct the jet gases downwardly.

The aircraft is preferably provided with two said pods which are respectively arranged on opposite sides of and equidistant from, the aircraft fuselage.

It will be appreciated that if one of the engines in one of the said pods fails, any resulting out-of-balance moment will be as small as possible.

Figure 3:
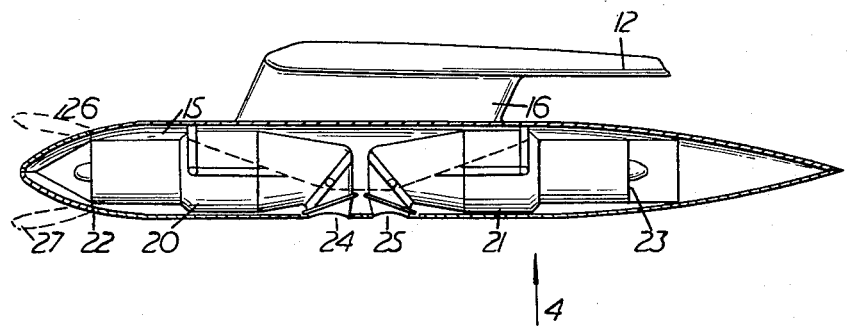
Figure 4:
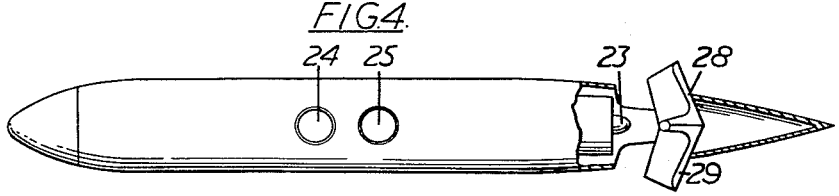
Figure 5:
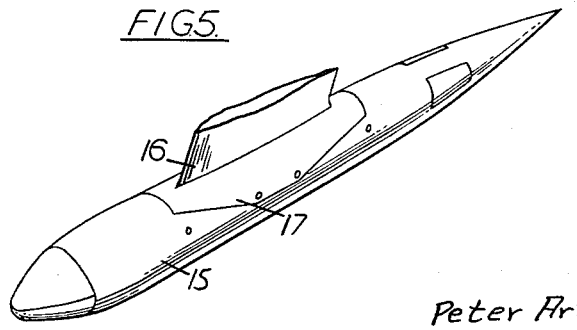

The invention is illustrated, merely by way of example, in the accompanying drawings in which:

FIGURE 1 is a side view of an aircraft provided with power plant according to the present invention, FIGURE 2 is a plan of the aircraft shown in FIGURE 1, FIGURE 3 is a part sectional view on a larger scale of part of the structure shown in FIGURE 1, FIGURE 4 is an underneath plan view looking in the direction of the arrow 4 of FIGURE 3, and FIGURE 5 is a perspective view of a pod forming part of the said aircraft.

Referring to the drawings, an aircraft 10 is provided with a fuselage 11 and with a substantially delta-shaped wing 12. The fuselage 11 carries a forward propulsion gas turbine engine 13 having a divided air intake 14.

Mounted beneath the wing 12, and arranged on opposite sides of and equidistant from the fuselage 11, are two pods 15. Each of the pods 15 is carried from the wing 12 by a strut 16 which is connected to its pod 15 by a saddle 17 (FIG. 5). The saddle 17 is made of metal, but the outer wall structure of each of the pods 15 is made of synthetic resin material, such for example as fibre glass.

Mounted within each of the pods 15 are two gas turbine jet lift engines 20, 21, which extend longitudinally of the pod and whose air intakes 22, 23 face respectively forwardly and rearwardly. The engines 20, 21 are respectively provided with exhaust nozzles 24, 25 which serve to deflect the jet gases vertically downwardly.

At the forward end of each of the pods 15 are a pair of pivotally mounted doors 26, 27, which may be moved between a closed position (shown in full lines in FIGURE 3) in which they prevent air from entering the air intake 22 and in which they form a smooth continuation of the remaining part of the outer wall structure of the pod, and an open position (shown in dotted lines in FIGURE 3) in which they permit ram air to enter the air intake 22.

Each of the pods 15 is also provided with a pair of pivotally mounted doors 28, 29 which, when in the open position shown in FIGURE 4, serve to scoop air into the air intake 23 when the aircraft is travelling forwardly. The doors 28, 29 are however movable into a closed position, shown in FIGURE 5, in which they prevent air from being drawn into the air intake 23.

It will be appreciated that if one of the engines in one of the pods 15 fails, the resulting out-of-balance moment is small by reason of the fact that the nozzles 24, 25 of each of the pods are disposed closely adjacent to each other.

The pods 15 may be attached to an existing aircraft on that part thereof to which bombs, fuel tanks or rockets are normally attached so as to decrease the take-off run of the aircraft.

I claim:

1. Power plant comprising an elongated pod, two jet engines which are mounted back to back within the pod and which extend longitudinally of the pod, the two jet engines having exhaust nozzles which are disposed adjacent to each other and which direct the jet gases transversely of the pod, the said nozzles being disposed centrally of the length of the pod, and two sets of doors, one set for each engine, which are carried by said pod and which may be opened and closed to permit and prevent air from being drawn into the engines, the doors, when closed, forming a part of the outer wall structure of the pod, which part merges smoothly into the remaining part thereof, one of said sets of doors serving, when the pod is travelling longitudinally forwardly, to scoop air into the respective engine.

2. In an aircraft, power plant comprising an elongated pod, two jet engines which are mounted back to back within the pod and which extend longitudinally of the pod, the two jet engines having exhaust nozzles which are disposed adjacent to each other and which direct the jet gases transversely of the pod, the said nozzles being disposed centrally of the length of the pod and on the longitudinal axis thereof, and two sets of doors, one set for each engine, which are carried by said pod and which may be opened and closed to permit and prevent air being drawn into the engines, the doors, when closed, forming a part of the outer wall structure of the pod, which part merges smoothly into the remaining part thereof, one of said sets of doors serving, when the pod is travelling longitudinally forwardly, to scoop air into the respective engine, the said pod being horizontally disposed and the said nozzles being arranged to direct the jet gases downwardly.

References Cited by the Examiner
UNITED STATES PATENTS

| | | | |
|---|---|---|---|
| 2,870,978 | 1/59 | Griffith et al. | 244—52 X |
| 2,885,159 | 5/59 | Ashwood | 244—12 |
| 3,060,685 | 10/62 | Tonnies et al. | 244—52 X |
| 3,066,889 | 12/62 | Kelly | 244—12 |

MILTON BUCHLER, *Primary Examiner.*
ANDREW H. FARRELL, *Examiner.*